T. S. Lambert,
Wringer Roll,
№ 40,845. Patented Dec. 8, 1863.

Witnesses:
E. W. W. Griffin
G. H. Smith.

Inventor:
T. S. Lambert

UNITED STATES PATENT OFFICE.

T. S. LAMBERT, OF PEEKSKILL, NEW YORK.

IMPROVED ROLLER FOR WRINGING-MACHINES.

Specification forming part of Letters Patent No. 40,845, dated December 8, 1863.

*To all whom it may concern:*

Be it known that I, T. S. LAMBERT, of Peekskill, Westchester county, New York, have invented a new and Improved Roller for Wringing-Machines; and I do hereby declare that the following is a full and exact description thereof, reference being had to the accompanying drawings and the figures marked thereon.

The nature of my invention consists in forming the surface of my roller in such a manner that it shall be firm enough to press out the water from the articles submitted to its action, and at the same time yielding enough to allow hard substances, buttons, &c., to pass over it without tearing them from their holding. For this purpose I take any cordage of proper thickness and firmness, and wind it around the roller from one end to the other, the ends of the cordage being fastened by any of the ordinary devices adapted to such a purpose. The best cordage is probably the common grass clothes-line; it is about the most proper size, and has about the most desirable firmness. Several different kinds, however, may be used with about equal effect. Shoulders may be made near the end of the rollers, to prevent the cordage from slipping in either direction. If it is used upon two rollers, as it should be, it will be best to have the rollers so made and wound that the swell of the cordage on one roller falls or presses between the swells of the other roller.

Figure 1:
Figure 2:
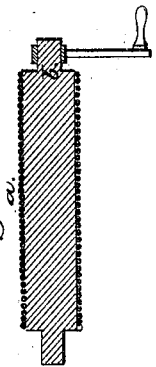

Figure 1 represents, *a*, the cordage wound upon the solid part of the roller, of which *b* is a bearing. Fig. 2 represents a section of another roller, with a handle attached. *a*, as before, is the cordage, and *b* is the solid part.

What I claim as my invention, and desire to secure by Letters Patent, is—

The application of any kind of cordage to form the surface of rollers in wringing-machines, in the manner and for the purposes substantially as set forth.

T. S. LAMBERT.

Witnesses:
 EDM. F. BROWN,
 G. A. C. SMITH.